United States Patent
Mouradzadegun

(10) Patent No.: US 12,195,587 B2
(45) Date of Patent: Jan. 14, 2025

(54) SYNTHESIS OF A BIOCOMPATIBLE, BIODEGRADABLE, AND TUNABLE SHAPE MEMORY POLYMER TRIGGERED AT BODY TEMPERATURE

(71) Applicant: Shape Memory Polymers Inc., Hamilton (CA)

(72) Inventor: Arash Mouradzadegun, Tehran (IR)

(*) Notice: Subject to any disclaimer, the term of this patent is extended or adjusted under 35 U.S.C. 154(b) by 151 days.

(21) Appl. No.: 18/114,816

(22) Filed: Feb. 27, 2023

(65) Prior Publication Data
US 2023/0312820 A1   Oct. 5, 2023

Related U.S. Application Data

(60) Provisional application No. 63/315,114, filed on Mar. 1, 2022.

(51) Int. Cl.
| | |
|---|---|
| *B29C 67/00* | (2017.01) |
| *B29C 43/00* | (2006.01) |
| *C08B 11/02* | (2006.01) |
| *C08B 11/20* | (2006.01) |
| *C08G 63/91* | (2006.01) |

(52) U.S. Cl.
CPC .......... *C08G 63/912* (2013.01); *B29C 43/003* (2013.01); *B29C 67/0011* (2013.01); *C08B 11/02* (2013.01); *C08B 11/20* (2013.01); *C08G 2230/00* (2013.01)

(58) Field of Classification Search
CPC ..................................................... B29C 43/00
See application file for complete search history.

(56) References Cited

PUBLICATIONS

Defize et al., "Multifunctional Poly( ε-caprolactone)-Forming Networks by Diels-Alder Cycloaddition: Effect of the Adduct on the Shape-Memory Properties", Macromolecular Chemistry and Physics 213, 2012, pp. 187-197. (Year: 2012).*

Defize et al. "Thermoreversibly Crosslinked Poly(ε-caprolactone) as Recyclable Shape-Memory Polymer Network", Macromolecular Rapid Communications 32, 2011, pp. 1264-1269. (Year: 2011).*

(Continued)

*Primary Examiner* — Atul P. Khare
(74) *Attorney, Agent, or Firm* — Nasser Ashgriz; UIPatent Inc.

(57) ABSTRACT

The present invention is a method to produce a biodegradable thermally induced shape memory polymer (SMP) based on poly(ε-caprolactone) (PCL) and ethyl cellulose (EC). In this synthesis method, after grafting the PCL on the linear EC, the PCL chains are end-functionalized with furan and maleimide moieties. The cross-linked network is prepared via Diels-Alder (DA) reaction between furanyl and N-maleimidyl PCL chains. The synthesized SMP demonstrates excellent shape memory properties at near body temperature (41° C.). Moreover, the polymer network is recyclable and re-processable, since the DA reaction is thermally reversible. The SMP of the present invention is well suited for numerous applications, especially in medical devices, given their excellent shape memory performance, tunable materials properties, body temperature-based stimulus, biocompatibility, and potential for biodegradation and resorption.

8 Claims, 8 Drawing Sheets

(56) References Cited

PUBLICATIONS

Bai et al., "A novel high mechanical strength shape memory polymer based on ethyl cellulose and polycaprolactone", Carbohydrate Polymers 96, 2013, pp. 522-527. (Year: 2013).*

Utroša et al., "Shape Memory Behavior of Emulsion-Templated Poly(ε-caprolactone) Synthesized by Organocatalyzed Ring-Opening Polymerization", Macromolecules 52, 2019, pp. 9291-9298. (Year: 2019).*

* cited by examiner

SYNTHESIS OF A BIOCOMPATIBLE, BIODEGRADABLE, AND TUNABLE SHAPE MEMORY POLYMER TRIGGERED AT BODY TEMPERATURE

CROSS REFERENCE TO RELATED APPLICATIONS

This application claims priority to provisional U.S. Patent Application No. 63/315,114, filed on Mar. 1, 2022, entitled "SYNTHESIS OF A BIOCOMPATIBLE, BIODEGRADABLE, AND TUNABLE SHAPE MEMORY POLYMER TRIGGERED AT BODY TEMPERATURE", the aforementioned application being hereby incorporated by reference in its entirety.

FIELD OF THE INVENTION

The present invention relates in general to a shape memory polymer synthesis, and in specific to a new tunable protocol for synthesis of shape memory polymer and more specific to biodegradable, biocompatible, and recyclable polymer with an excellent shape memory recovery stimulated by body temperature.

BACKGROUND OF THE INVENTION

Shape memory polymers are a new class of smart materials that can return to their original shape from a deformed state triggered by a stimulus such as temperature. Shape memory polymers (SMP) have emerged as an important class of smart materials in medicine due to their ability to change shape in response to a specific stimulus enabling the simplification of medical procedures, the use of minimally invasive techniques, and access to new treatment methods.

The stimulus or trigger can be light, temperature, or pressure. SMPs are well suited for numerous medical applications given their excellent shape memory performance, tunable material properties, minimal toxicity, and biodegradation and resorption potential. Compared to shape memory alloys, SMPs are lightweight and biocompatible. Unfortunately, their commercial applications are not widespread. Only a few companies are producing medical devices with SMPs. Due to unavailability of suitable material, SMP-based medical devices are limited. Convenient and tunable strategy for synthesis of SMPs are restricted especially in the case of biocompatible ones.

Most SMPs developed so far are not biodegradable and suffer the tedious process of synthesis. Thus, applications that require a biodegradable SMP, such as a temporary stent, is not realized. Another challenge is that many SMPs are not tunable for activating at human body temperature. Therefore, they require an external stimulus to activate the SMP. Many SMPs do not have suitable mechanical properties (durability of switching), such as shape recovery, needed for biomedical applications.

Due to the potential applications of PCL (poly(ε-caprolactone) in biomedicine, PCL-based SMPs with low $T_m$ becomes one of the researchers' concern in the field. However, the PCL molecular weights (M) were low and its mechanical strengths is very poor. Thomas Defize et al synthesized chemically cross-linked 4-arm star-shaped PCLs SMPs using DA (Diels-Alder) reaction, however with the lack of hard segment polymer performs the poor mechanical properties.

Cellulose can be a source for polymer reinforcements and it is one of the most abundant substances in nature, where it constitutes the primary structural material in a wide variety of plant life, as well as being present in some animal life. In addition, the attributes of low cost, low density, high stiffness, consumable nature and biodegradability constitute major incentives for exploring new uses. Moreover, cellulose has polar groups that can interact with polar polymers, such as PCL.

Yongkang Bai et al. synthesized a series of EC/PCL SMPs (ethyl cellulose polymer (ε-caprolactone) SMPs with outstanding mechanical strength (EC act as hard segment). However, the polymer suffers from low shape fixity and reprocessability due to using 4,4diphenylmethane diisocyanate (MDI) as a fixed cross link reagent.

The SMP market's primary driver is due to its application in healthcare. Unfortunately, very few commercial products are available in the market that utilizes the benefits provided by SMPs.

Therefore, to overcome these drawback, a new approach has been developed for synthesis of a EC/PCL SMP which activate around body temperature accompanying with excellent and reliable shape memory properties.

SUMMARY OF THE INVENTION

The present invention is a method and system to design a biodegradable thermally induced shape memory polymer based on poly(ε-caprolactone) (PCL) and ethyl cellulose (EC). EC and PCL both are well known for being biodegradable and biocompatible. In the synthesis method, the PCL chains are end-functionalized with furan and maleimide moieties. The cross-linked network is prepared via Diels-Alder (DA) reaction between Furan terminated PCL chains and Maleimide terminated PCL chains. EC-PCL-Furan and EC-PCL-Maleimide are reacted with each other in the stoichiometric ratio of DA moieties (Furan and Maleimide), which results in a chemically cross-linked SMP network.

Generally, a shape memory network consists of at least two segments, a hard segment and a soft segment. In the synthesized EC-PCL-SMP, the hard segment is achieved by chemically cross-linking the polymer network, where the PCL plays the role of the soft segment of the polymer network.

The novel biocompatible polymer can efficiently be formed by spontaneous Diels-Alder coupling of ethyl cellulose (EC) and polycaprolactone. (PCL) prepolymers having dienophile (maleimide) and diene (furan) terminals. The polymer exhibit outstanding reprocessability and mechanical strength.

The shape memory switching temperature of the polymer is tunable. The calculated gel content and degree of swelling is 94.4% and 396.186% respectively. The obtained results proved a significant degree of cross-linking.

Thermal properties and shape memory effects have been studied by DSC (Differential Scanning calorimetry Testing) and DMTA (Dynamic mechanical thermal analysis) techniques respectively. The hierarchical methodology for the synthesis of SMP introduced by the present invention is an excellent shape memory recovery at 41° C. (around human body temperature and tunable). Due to substrates the synthesized SMP is biodegradable and biocompatible. Modified hard and soft segments (designed end-functionalized EC and PCL) provide high shape fixity ($R_f$) and high shape recovery ($R_r$), which are highly desirable for biomedical applications. The $R_f$ provides an indicator of how well the temporary shape can recover the permanent shape (with 100% being perfect shape fixing or recovery). Finally, all the medical devices made from this SMP, is recyclable and re-processable as the underlying chemical reaction (DA-rDA) is thermally reversible.

The SMP of the present invention is well suited for numerous applications, especially in medical devices, given their excellent shape memory performance, tunable materials properties, body temperature-based stimulus, biocompatibility, and potential for biodegradation and resorption.

Most SMPs are not biodegradable, many of them do not activate at body temperature and require an external stimulus and inadequate mechanical properties.

It is therefore an object of the present invention to provide SMP which is convenient and provides recyclability and re-processability due to the DA reaction that is thermally reversible and to be used in all the medical devices.

It is another object of the present invention to synthesis a SMP which demonstrates an excellent shape memory recovery at 41° C. (around human body temperature and tunable).

It is another object of the present invention to synthesis a SMP which is biodegradable and biocompatible.

It is another object of the present invention to offer a SMP which is well suited for numerous applications, especially in medical devices in dental (impression material, mouth guards, and wire), wound healing (sutures, and staples), embolization (coils), and stents (coronary in which the device removal is not necessary).

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

Figure 1:
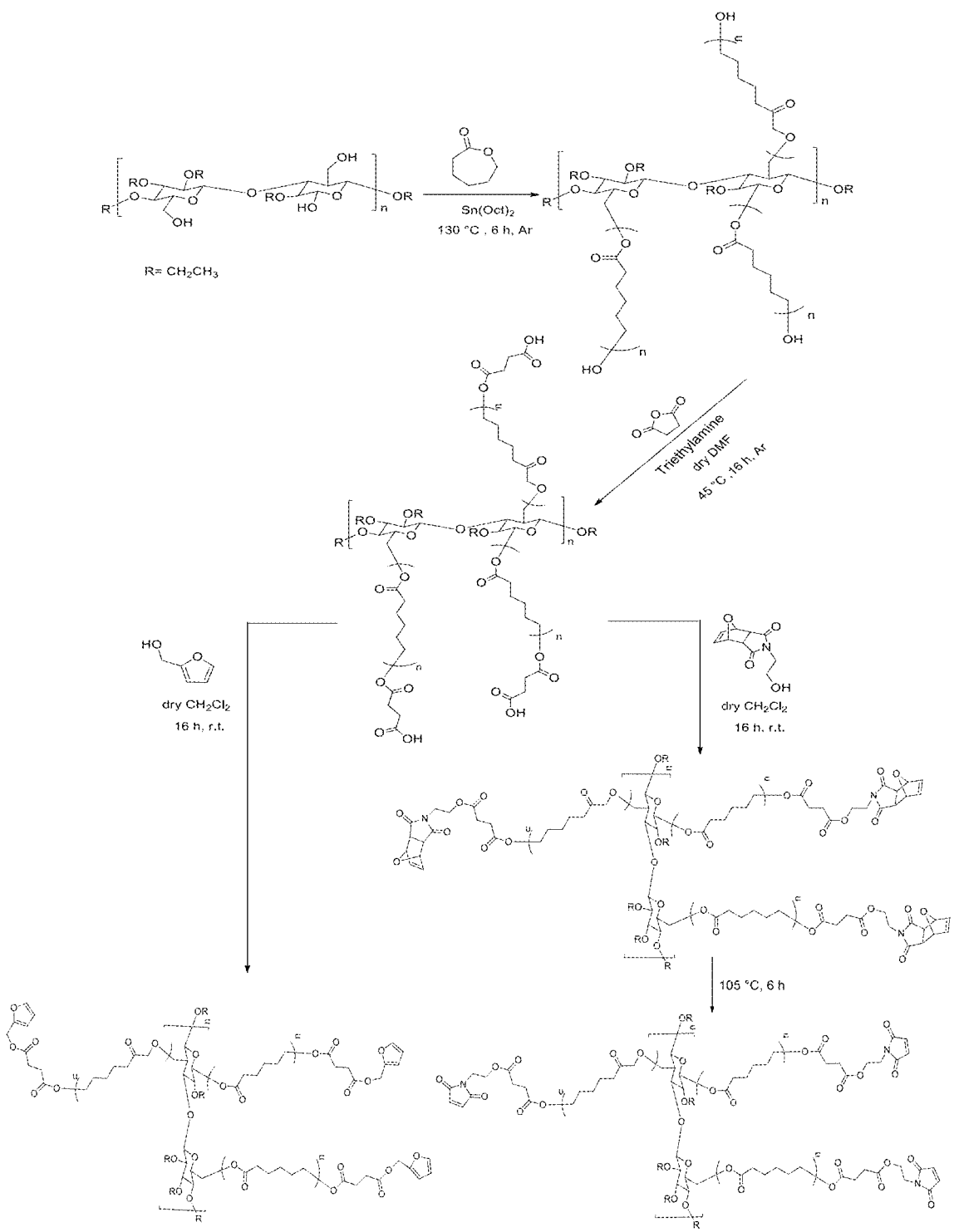
FIG. 1 is a schematic view of the main synthesis process according to the present invention.

The present invention is a new approach developed for synthesis of a EC/PCL SMP which activate around body temperature accompanying with excellent and reliable shape memory properties. To achieve that, in current invention, a SMP network was synthesized based on PCL and EC via reversible DA reaction. This strategy could provide a potential platform for enhancing the mechanical strength and reprocessability of environmentally friendly final product (FIG. 1). The network structure of the polymer was formed by linear EC backbones which were linked by grafted PCL chains.

The DA reaction is a well-known reaction and widely used to synthesis various types of polymer such as biodegradable polymer, copolymer, self-healing polymer, SMPs and etc. DA reaction leads normally to chemically cross-linked network which is thermally reversible and the final product will possess reprocessable and recyclable features.

PCL and linear EC were chosen as soft and hard segment respectively, due to their biocompatibility, biodegradability and non-toxic features and most importantly strain-induced crystallization characteristic and suitable and tunable melting point.

Method

Synthesis of Ethyl Cellulose Polymer
(ε-Caprolactone) (EC-PCL-OH

To a 50-ml flame dried three-neck round-bottom flask with a magnetic stir bar was added 2.25 g of EC and 15 of mL ε-caprolactone. After complete solubilization of EC in ε-caprolactone at 130° C. under argon atmosphere, 0.5 wt. % of Stannous octoate was added and the mixture was stirred at 130° C. for 6 h under argon atmosphere. The resulting polymer cooled to room temperature then dissolved in dichloromethane and precipitated from n-hexane.

Synthesis of Carboxylic Acid-Terminated Ethyl
Cellulose Polymer (ε-Caprolactone)
(EC-PCL-COOH 16 g of EC-PCL-OH (14.3 mmol OH containing) and 300 mL freshly dried DMF was added to a 500-mL flame dried three-neck round-bottom flask with a magnetic stir bar. After solubilization of EC-PCL-OH, 1.431 g (14.3 mmol) of succinic anhydride, 1.98 g (14.3 mmol) of triethylamine were added to the solution. Then, the solution stirred at 45° C. under argon atmosphere for 16 h. The final solution cooled to room temperature and EC-PCL-COOH precipitated from methanol.

Synthesis of Furan-Terminated Ethyl Cellulose
Polymer (ε-Caprolactone) (EC-PCL-furan 7.5 g (7.15 mmol COOH containing) of EC-PCL-COOH was transferred to a 500-mL flame dried three-neck round-bottom flask and 250 ml of freshly dried dichloromethane was added. After solubilization of EC-PCL-COOH, 0.622 mL (7.15 mmol) of furfuryl alcohol, 1.483 g (7.15 mmol) of DCC, 0.0875 g (7.15 mmol) of DMAP was added to the solution. The solution stirred at room temperature under argon atmosphere for 16 h. After the filtration of formed dicyclohexylurea, the EC-PCL-furan precipitated from Methanol.

Synthesis of 4,10-Dioxatricyclo[$5.2.1.0^{2,6}$]dec-8-Ene-3,5-Dione (A 13.48 g (137 mmol) of maleic anhydride, 80 mL of Benzene was transferred to a 250-mL flame dried three-neck round-bottom flask. After solubilization of maleic anhydride, 10 mL (137 mmol) of Furan was added. The reaction was stirred at room temperature under argon atmosphere for 24 h. The product was precipitated and removed out of the solution and washed three times with 20 ml of diethyl ether. mp 113-115° C.; FT-IR u=3091, 3040, 1849, 1780, 1057 cm$^{-1}$.

Synthesis of 4-(2-Hydroxy-Ethyl)-10-Oxa-4-Aza-Tricyclo[5.2.1.0$^{2,6}$]-dec-8-ene-3,5-dione (B 10 g (60.2 mmol) of product A was suspended in 25 ml of freshly dried methanol in a 100-mL flame dried three-neck round-bottom flask with reflux condenser. Then 3.64 g (60.2 mmol) of ethanolamine was added. The solution was brought to reflux for 24 h. The solution cooled to room temperature and begun to crystalize. The crystals collected via vacuum filtration. mp 136-137° C.; FT-IR u=3462, 2929, 2874, 1664, 1095 cm$^{-1}$.

Synthesis of N-Maleimide-Terminated Ethyl Cellulose Polymer (ε-Caprolactone) (EC-PCL-Maleimide 7.5 g (7.15 mmol COOH containing) of EC-PCL-COOH was transferred to a 500-mL flame dried three-neck round-bottom flask. 250 mL of freshly dried dichloromethane was added. After solubilization of EC-PCL-COOH, 1.499 g (7.15 mmol) of B, 1.483 g (7.15 mmol) of DCC, 0.0875 g (0.715 mmol) of DMAP was added to the solution. The solution was stirred at room temperature under argon atmosphere for 16 h. After the filtration of formed dicyclohexylurea, the EC-PCL-maleimide precipitated from methanol then filtered and dried by vacuum. The polymer was then heated at 105° C. for 6 h to eliminate furan.

Preparation of Cross-Linked Network by Diels-Alder Reaction 6.1 g (7.15 mmol) of EC-PCL-furan and 5.7 g (7.15 mmol) of EC-PCL-maleimide were heated and blended at 105° C. for 30 minutes. Then the mixture was placed in 35×35 cm$^2$ mold (the thickness was adjusted 1 mm). The mold was kept constantly under load of 10 Kg at 65° C. in the oven for 72 h. The mold cooled to room temperature then recovered as a flat sheet and was kept at room temperature for 7 days.

Retro Diels-Alder Reaction

The final SMP was heated at 120° C. for 20 minutes and was blended then re-molded again at same conditions.

Characterization Techniques

Products were characterized by IR spectrum. IR spectra were obtained on Perkin-Elmer model Spectrum Two FT-IR spectrophotometer. Melting points are determined on a Thermo Scientific 9200 apparatus. Differential scanning calorimetry was performed using Mettler Toledo instrument model DSC1 under nitrogen atmosphere. For this measurement, the sample was first cooled down to −80° C. then heated to 80° C., then the sample was cooled to −80° C. and finally heated to 80° C., the cooling and heating rate was 5° C./min: Glass transition temperature ($T_g$), melting point ($T_m$), Crystallization temperature ($T_c$) and enthalpy change were obtained from the second heating. Shape memory properties were measured by DMTA Triton instrument model TTDMA with 5° C./min heating and cooling rate.

FIG. 1 demonstrate the preparation of end functionalized EC-PCL chains. At first, ε-caprolactone was grafted to EC by ring opening polymerization with the 12% wt EC content.

Figures 2A, 2B:
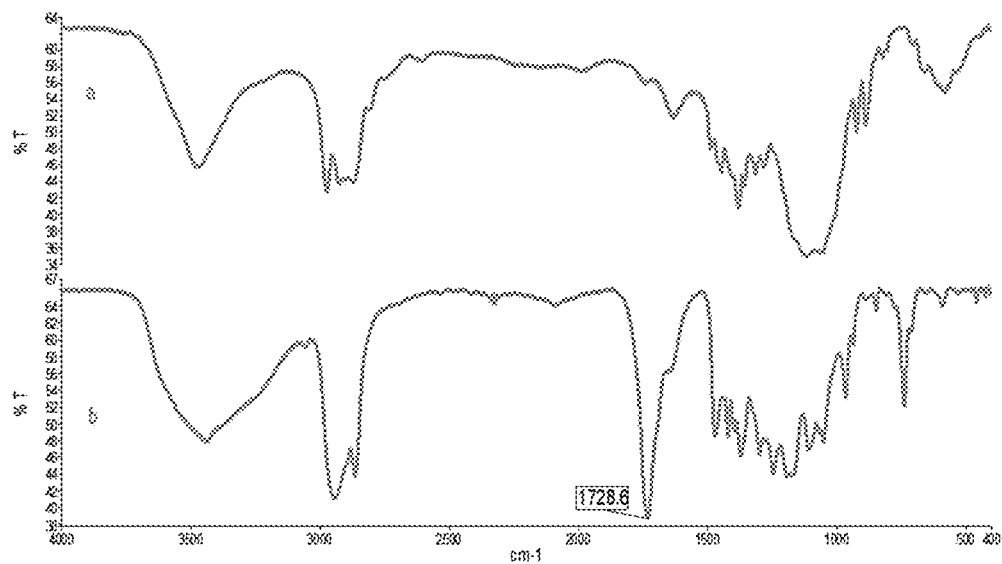
FIG. 2A is a spectrum showing the FT-IR of the EC corresponding to stretching vibration of C—O—C and O—H respectively.
FIG. 2B is a spectrum showing the FT-IR of the EC-PCL corresponding to stretching vibration of C=O in ester bond.

FIGS. 2A and 2B show the FT-IR of the EC and EC-PCL-OH respectively. The absorption peaks at 1063 and 3481 cm$^{-1}$, which is shown in FIG. 2A were corresponding to stretching vibration of C—O—C and O—H, respectively. Moreover, the absorption peaks were at 2879 and 2978 cm$^{-1}$ were attributed to stretching vibration of aliphatic C—H. However, the appearance of sharp absorption peak at 1728 cm$^{-1}$ in FIG. 2B was related to stretching vibration of C═O in ester bond. As it is obvious in FIGS. 2A and 2B, the PCL chains were grafted to EC and ring opening polymerization has been successfully performed.

At the following to achieve a thermally reversible cross-linked EC-PCL, the PCL chains were end functionalized with DA moieties; Furan and Maleimide. For this purpose, first EC-PCL-OH chains were reacted with Succinic anhydride and Carboxylic acid terminated chains (EC-PCL-COOH) were achieved.

Figures 3A, 3B, 3C:
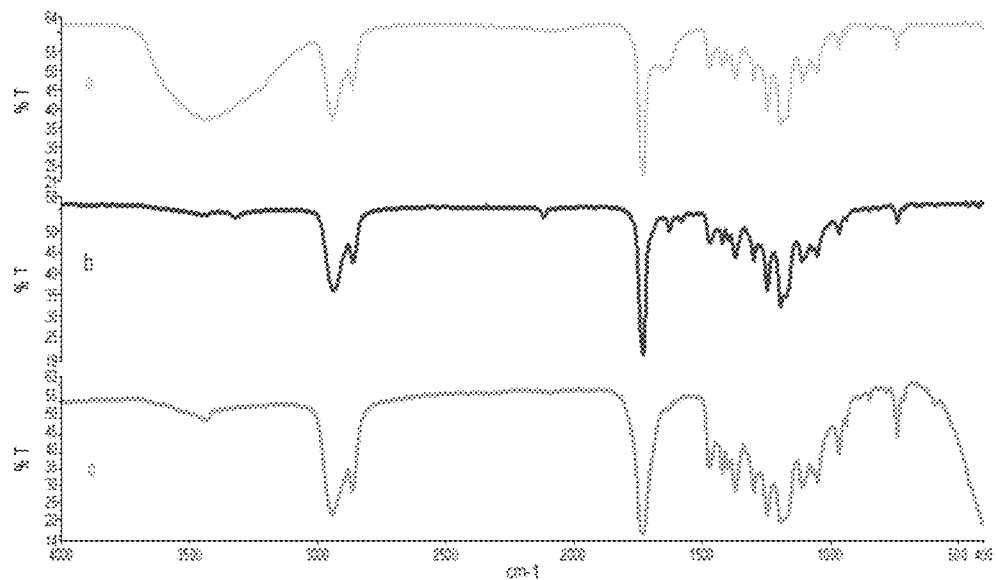
FIG. 3A illustrates the FT-IR of EC-PCL-COOH.
FIG. 3B illustrates the typical FT-IR of formed EC-PCL-Furan.
FIG. 3C illustrates the FT-IR of EC-PCL-Maleimide.

FIG. 3A illustrates the FT-IR of EC-PCL-COOH. It can be observed that the absorption peak at 1729 cm$^{-1}$ was assumed to be related to stretching vibration of C═O in ester bond. Furthermore, the absorption peak of hydroxyl group of COOH was located at 3442 cm$^{-1}$.

In the next step, the EC-PCL-COOH chains were reacted with Furfuryl alcohol with the presence of DCC/DMAP. Consequently, Furan terminated chains (EC-PCL-Furan) were recovered. FIG. 3B shows the typical FT-IR of formed EC-PCL-Furan. The disappearance of OH peak at 3400 cm$^{-1}$ is proven of formation of new ester bond.

On the other hand, to achieve Maleimide terminated EC-PCL chains, the EC-PCL-COOH was reacted with 4-(2-Hydroxy-ethyl)-10-oxa-4-azatricyclo[5.2.1.0$^{2,6}$]-dec-8-ene-3,5-dione in the presence of DCC/DMAP and followed by heating at 105° C. to eliminate the Furan and as result, EC-PCL-Maleimide was recovered.

FIG. 3C demonstrates the FT-IR of EC-PCL-Maleimide. It can be of formation of new ester bond between Carboxylic acid group of the EC-PCL-COOH chains and hydroxyl group of the Maleimide observed that the elimination of wide peak at 3400 cm$^{-1}$ was a delicate sign.

Finally, For DA reaction between Furan terminated PCL chains and Maleimide terminated PCL chains, EC-PCL-Furan and EC-PCL-Maleimide were reacted with each other in the stoichiometric ratio of DA moieties (Furan and Maleimide) as explained in section 2.3.7. and a chemically cross-linked SMP network was achieved. To study the cross-link density of the network the swelling experiments in chloroform was carried out at room temperature. The cross-linked EC-PCL pieces were first weighted and placed in chloroform which is a good solvent for PCL in dark place at room temperature for two days. Then the formed gel was collected and weighted. In the next step, the gel was dried via vacuum and weighted. The degree of swelling and gel content calculated on basis of following equations:

$$\text{degree of swelling} = \frac{\text{swollen weight} - \text{dried material weight}}{\text{dried material weight}} \times 100$$

$$\text{gel content} = \frac{\text{dried material weight}}{\text{initial material weight}} \times 100$$

The calculated gel content and degree of swelling was 94.4% and 396.186% respectively. The obtained results proved the significant degree of cross-linking.

Thermal Properties

Figure 4:
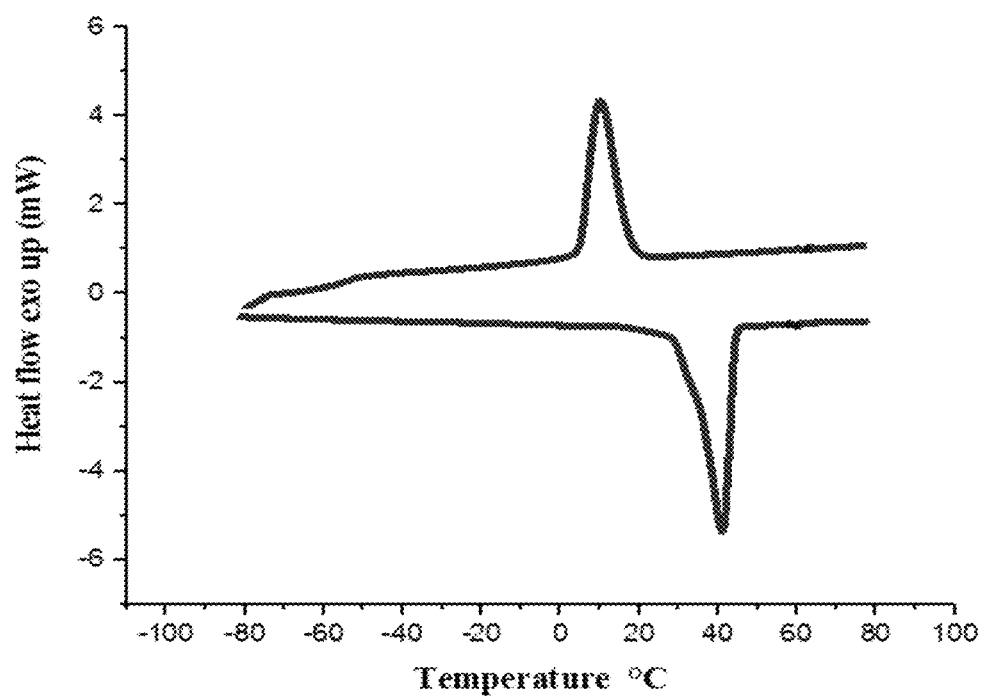
FIG. 4 illustrates DSC analysis of the synthesized EC-PCL-SMP.

The thermal properties of the SMP were studied by DSC. In FIG. 4 the second DSC scan for EC-PCL-SMP. $T_g$, $T_m$, $T_c$, enthalpy of fusion ($\Delta H_m$) and the degree of crystallization ($X_c$) are given in the table 1.

$X_c$ was calculated on basis of following equation:

$$X_c = \frac{\Delta H_m}{\Delta H_{100\%}} \times 100$$

where the $\Delta H_{100}\%$ is heat fusion of 100% crystalline PCL.

Table 1. Shows the Main thermal characteristics for EC-PCL-SMP.

TABLE 1 shows the Main thermal characteristics for EC-PCL-SMP

| $T_g$ | $T_m$ | $T_c$ | $\Delta H_m$ | $X_c$ |
|---|---|---|---|---|
| −60° C. | 41° C. | 10° C. | −71.12 jg$^{-1}$ | 52.68% |

Shape Memory Properties

Figure 5:
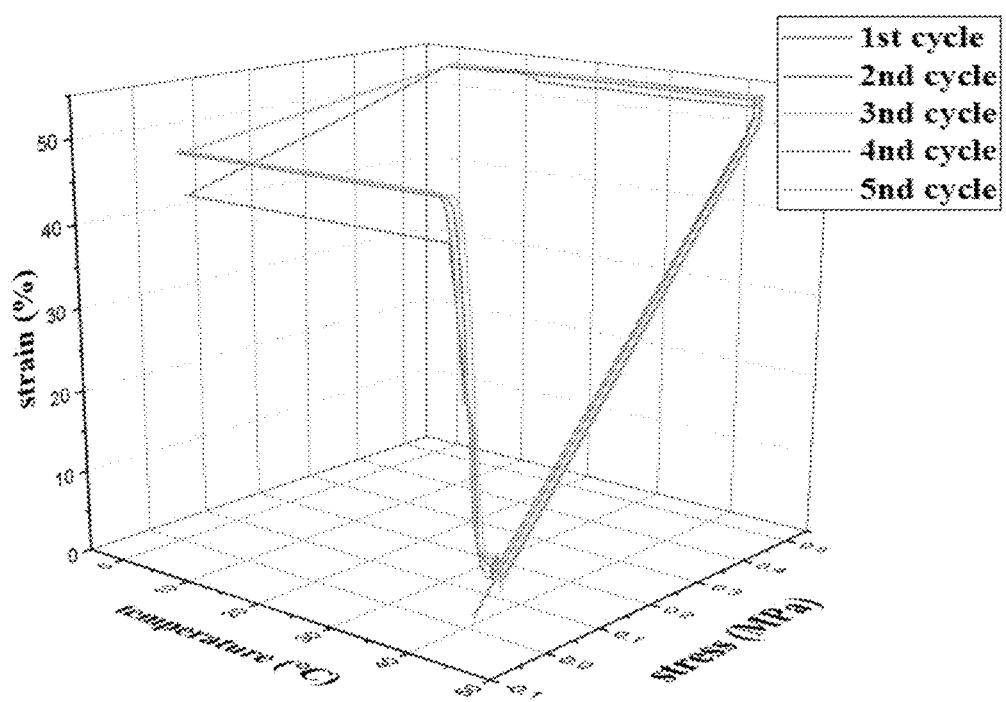
FIG. 5 illustrates DMAT (Dynamic mechanical thermal analysis) demonstration of EC-PCL-SMP.

The shape memory (SM) properties are typically quantified by the shape fixity ($R_f$) and shape recovery ratios ($R_r$). For cyclic shape memory evaluation, the polymer was cut to 13.00×3.00×1.00 mm$^3$ samples. The samples were first heated and maintained to maximum temperature of 45° C. for five minutes. Then, 0.5 MPa stress ($\sigma_m$) was applied. Consequently, the samples were stretched to 50% elongation ($\varepsilon_m$). Next, samples were cooled and maintained to 0° C. for five minutes at $\sigma_m$. After that, the stress was released and temporary strain ($\varepsilon_u$) was obtained. Then, samples reheated to 45° C. again in order to recover the permanent shape ($\varepsilon_p$). This process was repeated five times and the results are shown in FIG. 5.

Shape recovery ratio ($R_r$) and shape fixity ratio ($R_f$) for each cycle was calculated on basis of following equations:

$$R_r = \frac{\varepsilon_m - \varepsilon_p(N)}{\varepsilon_m - \varepsilon_p(N-1)}$$

$$R_f = \frac{\varepsilon_u(N)}{\varepsilon_m}$$

Where the N is the number of each cycle.

As it is obvious in FIG. 5, the first cycle is different than the others. This phenomenon is predictable in SMPs and it can be related to the history of polymer. However, the synthesized SMP was demonstrated that the $R_r$ and $R_f$ for the first cycle are 87.85% and 79.88%, respectively. While, in the other cycles, both $R_f$ and $R_r$ were increased to higher percentages. The results are given in the table 2. The synthesized SMP showed $R_f$=90.03 after five cycles. This relatively high shape fixity was attributed to the crystallinity of the soft segment ($X_c$=52.59%). When the sample reached the $T_m$ of the soft segment, the PCL's crystals were melt, then the sample was stretched and the sample was cooled down afterward, therefore began to crystallize. The crystallization process stabilizes the strained state via dissipation of the strain energy which leads to significant strain hardening, resulting in fixation of the temporary shape at the deformed state.

TABLE 2

Shape memory properties of EC-PCL-SMP

| | cycle | | | | |
|---|---|---|---|---|---|
| | 1 | 2 | 3 | 4 | 5 |
| $R_r$ (%) | 87.85 | 98.4 | 98.98 | 98.87 | 99.08 |
| $R_f$ (%) | 79.88 | 89.11 | 89.79 | 89.90 | 90.03 |

Furthermore, it can be seen in the FIG. 5 that the samples were started to recover the permanent shape at 38° C. DSC analysis should be considered to understand this behavior. As it can be seen in FIG. 4, the endothermic melting process was not accrued only at specific temperature of 41° C., in fact it happened in a specific temperature range that starts before 41° C. In other words, the 41° C. is the peak melting temperature, therefore when the significant amount of crystals melts in this temperature range, the sample logs in to recovery stage.

As shown in table 2, at the first cycle, the strain recovery was uncompleted, but EC-PCL-SMP demonstrated $R_r$=98.4% after one cycle and increased to 99.08% in the fifth cycle. This behavior was attributed to sufficient cross-link density and stable net points. Moreover, equilibrium nature of DA reaction should be considered. Therefore, even at 45° C., some retro-DA reactions can take place but in general, the shape memory properties were unaffected, otherwise the permanent shape would not completely recover.

Figures 6A, 6B, 6C:
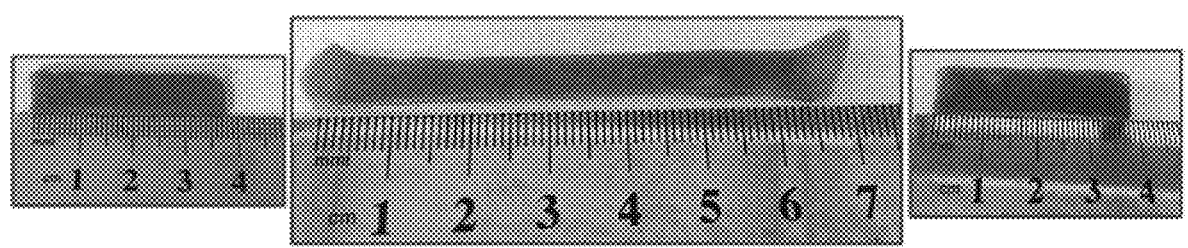
FIG. 6A illustrates the permanent shape of the Shape Memory behavior of EC-PCL-SMP.
FIG. 6B illustrates the temporary shape of the Shape Memory behavior of EC-PCL-SMP.
FIG. 6C illustrates the recovered shape of the Shape Memory behavior of EC-PCL-SMP.

FIGS. 6A, 6B and 6C show the Shape memory behavior of EC-PCL-SMP in (A) Permanent shape, (B) temporary shape and (C) recovered shape.

For cyclic shape memory evaluation, the polymer was cut to 13×3×1 mm$^3$ samples. The samples were first heated and maintained at a maximum temperature of 45° C. for five minutes. Then, 0.5 MPa stress was applied. Consequently, the samples were stretched to 50% elongation. Next, samples were cooled and maintained to 0° C. for five minutes at 0.5 MPa. After that, the stress was released, and a temporary strain was obtained. Then, samples reheated to 45° C. again to recover the permanent shape.

Figure 7A:
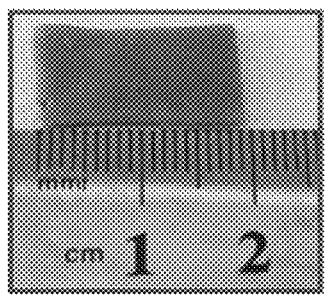
FIG. 7A illustrates the processability for permanent shape of Shape Memory behavior of re-molded EC-PCL-SMP.
Figure 7B:
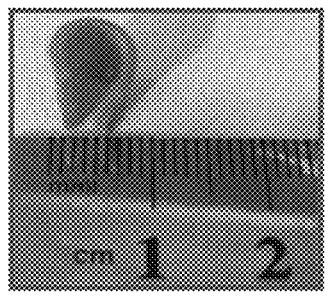
FIG. 7B illustrates the temporary shape of Shape Memory behavior of re-molded EC-PCL-SMP.
Figure 7C:
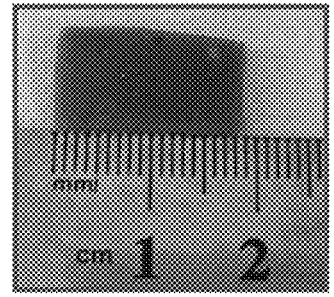
FIG. 7C illustrates the recovered shape of Shape Memory behavior of re-molded EC-PCL-SMP.

To investigate the retro-DA reaction the molded EC-PCL-SMP was heated to 120° C. for 20 minutes while melt blended. Then, the mixture was re-molded exactly like the first time molding conditions. Because of thermally reversible characteristic of DA reaction between Furan and Maleimide, the re-molded SMP showed shape memory effect. Therefore, the original shape can be changed and a new permanent shape could be developed in the polymer, in other words the memory of the polymer could be removed and a new memory replaced. FIGS. 7A, 7B and 7C represents shape memory effect of the re-molded SMP, in which 7A represents the permanent shape, 7B temporary shape and 7C recovered shape.

The biodegradable thermally induced SMP was designed based on EC/PCL via DA reaction. The synthesized SMP illustrated excellent shape memory effect around body temperature (41° C.). The resulting cross-linked polymer network exhibits excellent reversibility as proven by DMTA and the retention of properties upon reprocessing the material. Thermal analysis demonstrated very good shape fixity and moderate shape recovery in which $R_r$=99.08% and $R_f$=90.03% after five cycles which was due to the significant crystallinity of the soft segment ($X_c$=52.59%) and stability of the hard segment. These reliable shape memory effect can introduce the final product as a good candidate for designing smart biomedicine devices.

Figure 8:
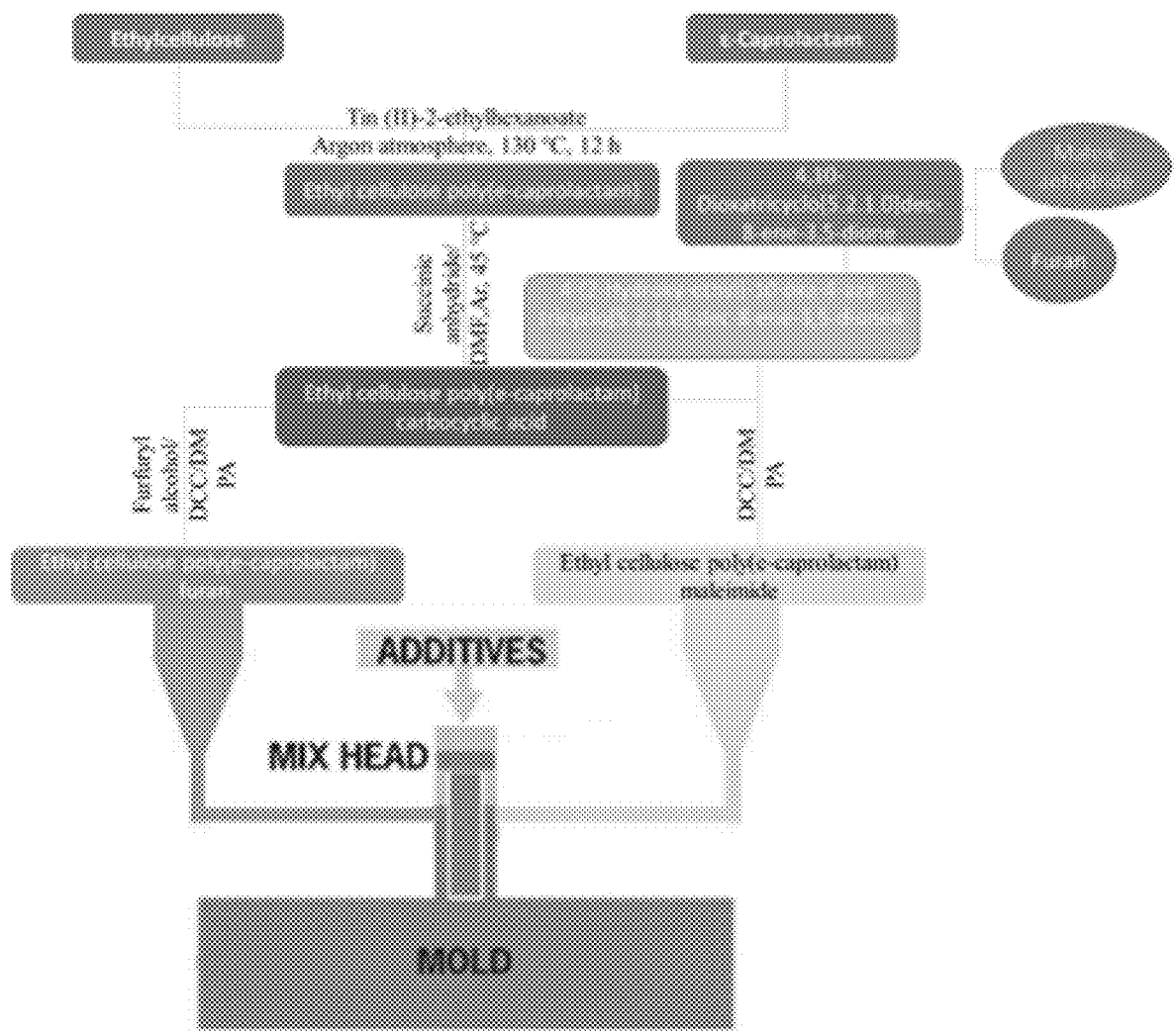
FIG. 8 is a schematic diagram of SMP synthesis showing the reactions and the sequence of reactions to synthesize the shape memory polymer.

FIG. 8 shows the reactions and the sequences of the reactions to synthesize the shape memory polymer. It also notes the reaction conditions such as time and temperature.

The first step is the preparation of Ethyl cellulose polymer (ε-caprolactam) (EC-PCL). ε-caprolactone was grafted to EC by ring-opening polymerization with 10-15 weight % EC content.

Step 2 shows the end functionalization of EC-PCL. To achieve a thermally reversible cross-linked EC-PCL, the PCL chains were end-functionalized with Diels-Alder (DA) moieties; Furan and Maleimide. For this purpose, first EC-PCL-OH chains were reacted with Succinic anhydride, which resulted in Carboxylic acid terminated chains (EC-PCL-COOH). In the next step, the EC-PCL-COOH chains were reacted with Furfuryl alcohol in the presence of DCC/DMAP. Consequently, Furan terminated chains (EC-PCL-Furan) were formed. To achieve Maleimide terminated EC-PCL chains, the EC-PCL-COOH was reacted with 4-(2-Hydroxy-ethyl)-10-oxa-4-azatricyclo[5.2.1.0]-dec-8-ene-3,5-dione in the presence of DCC/DMAP and followed by heating at 105° C. to eliminate the Furan, and as a result, EC-PCL-Maleimide was synthesized.

Step 3 shows the SMP network. For DA reaction between Furan terminated PCL chains and Maleimide terminated PCL chains, EC-PCL-Furan and EC-PCL-Maleimide were reacted with each other in the stoichiometric ratio of DA moieties (Furan and Maleimide), which resulted in a chemically cross-linked SMP network. Generally, a shape memory network consists of at least two segments, a hard segment and a soft segment. In the synthesized EC-PCL-SMP, the hard segment was achieved by chemically cross-linking the polymer network, where the PCL plays the role of the soft segment of the polymer network. Therefore, the synthesized SMP's transition temperature is the melting temperature of the PCL (41° C.).

The convenient Diels Alder reaction between EC and PCL is the most important part of this invention. However, the functionalization of the initial EC-PCL chain with Furan and Maleimide moieties are equally important. The ratio of the soft segment to the hard segment also affects the properties of the SMP.

The necessary chemicals in this application are EC and PCL. However, other chemicals can be replaced. The processing temperature, time and chemical concentrations can be optimized to increase the throughput of the reaction and tune the mechanical properties such as triggering temperature and recovery.

The synthesis of the SMP can be scaled up by using appropriate equipment such as large reactors and mixers. The reaction can also be optimized by varying the process temperature, processing time, and material concentration. Many medical devices can be manufactured using this SMP. Different medical devices made from the SMP, such as surgical splints, mouthguards, orthodontic wire, wound closing sutures and staples, embolization devices, and stents.

Shape recovery properties necessary for real-life applications are challenging to achieve. The research optimized the recovery property by modifying the reaction. Various experiments and trial-and-error provided the suitable reaction conditions to synthesize the present SMP.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A method of making a shape memory polymer (SMP), comprising steps of:
   a) synthesizing ethyl cellulose polymer (ε-caprolactone) (EC-PCL-OH) comprising steps of:
      i) adding 2.25 g of ethyl cellulose (EC) and 15 mL ε-caprolactone (PCL) to a first flask;
      ii) solubilizing the EC in the ε-caprolactone at 130° C. under argon atmosphere to make a first mixture;
      iii) adding 0.5 wt. % of stannous octoate to the first mixture and stirring at 130° C. for 6 hours under argon atmosphere to make a first polymer; and
      iv) cooling the first polymer to room temperature, and dissolving the first polymer in dichloromethane and precipitating EC-PCL-OH from n-hexane;
   b) synthesizing carboxylic acid-terminated ethyl cellulose polymer (ε-caprolactone) (EC-PCL-COOH) comprising the steps of:
      i) adding 16 g of the EC-PCL-OH, containing 14.3 mmol OH, and 300 mL of freshly dried dimethylformamide (DMF) to a second flask;
      ii) solubilizing the EC-PCL-OH in 1.431 g (14.3 mmol) of succinic anhydride;
      iii) adding 1.98 g (14.3 mmol) of triethylamine to the EC-PCL-OH to form a second mixture and stirring the second mixture at 45° C. under argon atmosphere for 16 h; and
      iv) cooling the second mixture to room temperature and precipitating EC-PCL-COOH from methanol;
   c) synthesizing furan-terminated ethyl cellulose polymer (ε-caprolactone) (EC-PCL-furan) comprising the steps of:
      i) transferring 7.5 g (containing 7.15 mmol COOH) of the EC-PCL-COOH to a third flask;
      ii) adding 250 mL of freshly dried dichloromethane to the third flask to make a third mixture;
      iii) solubilizing the EC-PCL-COOH and adding 0.622 mL (7.15 mmol) of furfuryl alcohol, 1.483 g (7.15 mmol) of DCC, and 0.0875 g (7.15 mmol) of DMAP to the third mixture;
      iv) stirring the third mixture at room temperature under argon atmosphere for 16 h; and
      v) filtering dicyclohexylurea from the third mixture and precipitating EC-PCL-furan from methanol;
   d) synthesizing 4,10-dioxatricyclo[5.2.1.0$^{2,6}$]dec-8-ene-3,5-dione (product A) comprising the steps of:
      i) transferring 13.48 g (137 mmol) of maleic anhydride and 80 mL of benzene to a fourth flask;
      ii) solubilizing the maleic anhydride;
      iii) adding 10 mL (137 mmol) of furan to the fourth flask and stirring at room temperature under argon atmosphere for 24 h to make a fourth mixture; and iv) precipitating product A from the fourth mixture, removing the product A from the fourth mixture, and washing the product A three times with a washing solution;

e) synthesizing 4-(2-hydroxy-ethyl)-10-oxa-4-aza-tricyclo[5.2.1.0$^{2,6}$]-dec-8-ene-3,5-dione (product B) comprising the steps of:
 i) suspending 10 g (60.2 mmol) of the product A in 25 mL of freshly dried methanol in a fifth flask with a reflux condenser;
 ii) adding 3.64 g (60.2 mmol) of ethanolamine to the fifth flask to make a fifth mixture;
 iii) refluxing the fifth mixture for 24 h;
 iv) cooling the fifth mixture to room temperature and crystalizing to form crystals of product B; and
 v) collecting the crystals by a vacuum filtration;

f) synthesizing N-maleimide-terminated ethyl cellulose polymer (ε-caprolactone) (EC-PCL-maleimide) comprising the steps of:
 i) transferring 7.5 g (containing 7.15 mmol COOH) of the EC-PCL-COOH to a sixth flask;
 ii) adding 250 mL of freshly dried dichloromethane to the sixth flask;
 iii) solubilizing the EC-PCL-COOH;
 iv) adding 1.499 g (7.15 mmol) of the product B, 1.483 g (7.15 mmol) of DCC, and 0.0875 g (0.715 mmol) of DMAP to the sixth flask to make a sixth mixture;
 v) stirring the sixth mixture at room temperature under argon atmosphere for 16 h;
 vi) filtering dicyclohexylurea from the sixth mixture, precipitating EC-PCL-maleimide from methanol, and filtering and drying the EC-PCL-maleimide by vacuum; and
 vii) heating the EC-PCL-maleimide at 105° C. for 6 h to eliminate furan therefrom;

g) preparing a cross-linked network in the EC-PCL-furan by a Diels-Alder reaction comprising steps of:
 i) heating and blending 6.1 g (7.15 mmol) of the EC-PCL-furan and 5.7 g (7.15 mmol) of the EC-PCL-maleimide at 105° C. for 30 minutes to form a seventh mixture;
 ii) placing the seventh mixture in a mold;
 iii) keeping the mold constantly under load of 10 kg at 65° C. in an oven for 72 h; and
 iv) cooling the mold to room temperature, recovering a first SMP from the mold as a flat sheet, and keeping the sheet at room temperature for 7 days to form a second SMP; and h) heating and blending the second SMP at 120° C. for 20 minutes to make a final SMP,
 wherein the network structure of the final SMP is formed by linear EC backbones which are linked by grafted PCL chains, and
 whereby a switching temperature of shape memory polymer is tunable.

2. The method of claim 1, wherein the first flask is 50 mL flame dried three-neck round-bottom flask with a magnetic stir bar.

3. The method of claim 1, wherein the second, third, and sixth flasks are each a 500 mL flame dried three-neck round-bottom flask with a magnetic stir bar.

4. The method of claim 1, wherein the fourth flask is 250-mL flame dried three-neck round-bottom flask.

5. The method of claim 1 wherein the fifth flask is 100-mL flame dried three-neck round-bottom flask.

6. The method of claim 1, wherein the washing solution is 20 mL of diethyl ether.

7. The method of claim 1, wherein the mold is a 35×35 cm$^2$ mold with 1 mm thickness.

8. The method of claim 1, wherein a gel content and a degree of swelling of the final SMP is 94.4% and 396.186%, respectively.

* * * * *